US012332415B2

(12) United States Patent
Yanagisawa

(10) Patent No.: US 12,332,415 B2
(45) Date of Patent: Jun. 17, 2025

(54) ATTACHMENT OPTICAL SYSTEM AND PROJECTION DISPLAY SYSTEM

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 547 days.

(21) Appl. No.: 17/708,255

(22) Filed: Mar. 30, 2022

(65) Prior Publication Data
US 2022/0326491 A1    Oct. 13, 2022

(30) Foreign Application Priority Data
Mar. 31, 2021    (JP) .................... 2021-060380

(51) Int. Cl.
*G02B 17/08*    (2006.01)
*G02B 9/64*    (2006.01)
*G02B 13/16*    (2006.01)
*G03B 21/28*    (2006.01)

(52) U.S. Cl.
CPC .......... *G02B 17/0856* (2013.01); *G02B 9/64* (2013.01); *G02B 13/16* (2013.01); *G03B 21/28* (2013.01)

(58) Field of Classification Search
CPC ...... G02B 17/0856; G02B 9/64; G02B 13/16; G02B 15/10; G02B 17/0804; G03B 21/28; G03B 21/54

USPC ......................................................... 353/102
See application file for complete search history.

(56) References Cited

U.S. PATENT DOCUMENTS

| | | | | |
|---|---|---|---|---|
| 2006/0114575 | A1* | 6/2006 | Togino | G02B 13/06 |
| | | | | 359/725 |
| 2010/0238568 | A1* | 9/2010 | Togino | G02B 17/0804 |
| | | | | 359/730 |
| 2021/0232035 | A1* | 7/2021 | Yanagisawa | G02B 13/16 |
| 2022/0066180 | A1* | 3/2022 | Yanagisawa | G02B 17/0856 |

FOREIGN PATENT DOCUMENTS

| | | |
|---|---|---|
| JP | H11-305119 A | 11/1999 |
| JP | 2006-058354 A | 3/2006 |
| JP | 2011-257630 A | 12/2011 |

\* cited by examiner

*Primary Examiner* — Magda Cruz
(74) *Attorney, Agent, or Firm* — Oliff PLC

(57) ABSTRACT

An attachment optical system is detachably attached to a magnification side of a projection optical system provided to a projection display device, and projects projection light emitted from the projection optical system on an imaging plane different from a magnification side imaging plane of the projection optical system. The attachment optical system is provided with an optical element having a second optical axis arranged on an extension of a first optical axis of the projection optical system. The optical element has a plane of incidence arranged on the second optical axis, a first reflecting surface configured to reflect light emitted from the plane of incidence, a second reflecting surface configured to reflect light reflected by the first reflecting surface, and an exit surface configured to transmit light reflected by the second reflecting surface.

7 Claims, 10 Drawing Sheets

ATTACHMENT OPTICAL SYSTEM AND PROJECTION DISPLAY SYSTEM

The present application is based on, and claims priority from JP Application Serial Number 2021-060330, filed Mar. 31, 2021, the disclosure of which is hereby incorporated by reference herein in its entirety.

BACKGROUND

1. Technical Field

The present disclosure relates to an attachment optical system and a projection display system.

2. Related Art

An attachment optical system to detachably be attached to a projection optical system of a projector is described in JP-A-2011-257630 (Document 1). The attachment optical system in Document 1 is provided with an anterior group constituted by two reflecting surfaces and two transmissive surfaces rotationally symmetric around a central axis, and a posterior group which is rotationally symmetric around the central axis and has positive power. The anterior group is a certain optical element formed of a transparent medium. The anterior group is constituted by a first transmissive surface having positive power of entering the anterior group from afar, a first reflecting surface which is disposed at a posterior group side across the central axis from the first transmissive surface, and has positive power, a second reflecting surface which is disposed at the same side as the first reflecting surface, and is disposed at a longer distance from the posterior group than the first reflecting surface, and a second transmissive surface which is disposed at the extreme posterior group side, and has negative power in the order in which the light beam proceeds.

The attachment optical system is attached to the projector so that the central axis of the attachment optical system coincides with the optical axis of the projection optical system. In the state in which the attachment optical system is attached to the projector, the first transmissive surface is located on an extension of the optical axis of the projection optical system. The first reflecting surface and the second reflecting surface are located at one side of the optical axis of the projection optical system. The second transmissive surface is located at the other side of the first reflecting surface and the second reflecting surface across the optical axis of the projection optical system, and is at a distance from the extension of the optical axis of the projection optical system. Therefore, in Document 1, projection light which is emitted from the projector, and proceeds toward a screen via the attachment optical system is emitted toward a direction which does not overlap the extension of the optical axis of the projection optical system of the projector.

There is a demand of making projection light proceeding toward the screen via the attachment optical system reach the extension of the optical axis of the projection optical system of the projector when the attachment optical system is attached to the projection optical system of the projector.

SUMMARY

In view of the problems described above, an attachment optical system according to the present disclosure is detachably attached to a magnification side of a projection optical system provided to a projection display device, and projects projection light emitted from the projection optical system on an imaging plane different from a magnification side imaging plane of the projection optical system. The attachment optical system is provided with an optical element having a second optical axis arranged on an extension of a first optical axis of the projection optical system. The optical element has a plane of incidence arranged on the second optical axis, a first reflecting surface configured to reflect light emitted from the plane of incidence, a second reflecting surface configured to reflect light reflected by the first reflecting surface, and an exit surface configured to transmit light reflected by the second reflecting surface. The first reflecting surface and the exit surface are continuous in an axial area where light passes the second optical axis and the first optical axis. The imaging plane of the attachment optical system is substantially parallel to a demagnification side imaging plane of the projection optical system on which a light modulation element provided to the projection display device forms a projection image.

Further, a projection display system according to the present disclosure includes the attachment optical system described above, and a projection display device provided with a projection optical system. The attachment optical system is detachably attached to the projection optical system.

DESCRIPTION OF AN EXEMPLARY EMBODIMENT

A projector system as an embodiment of a projection display system according to the present disclosure will hereinafter be described in detail with reference to the drawings.

Practical Example 1

Figure 1:
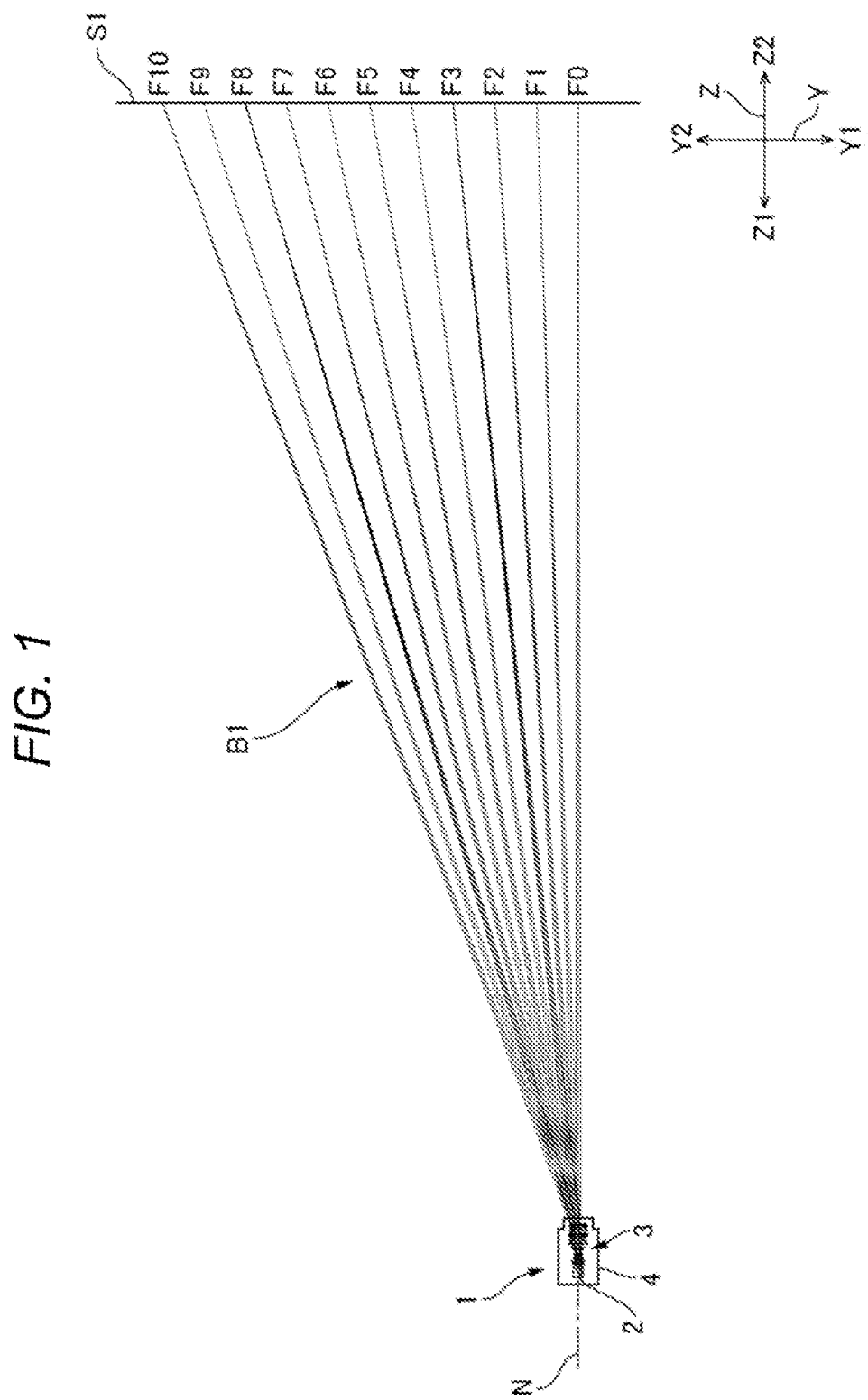
FIG. 1 is a ray diagram schematically showing the whole of the projector to which the attachment optical system according to Practical Example 1 can be attached.
Figure 2:
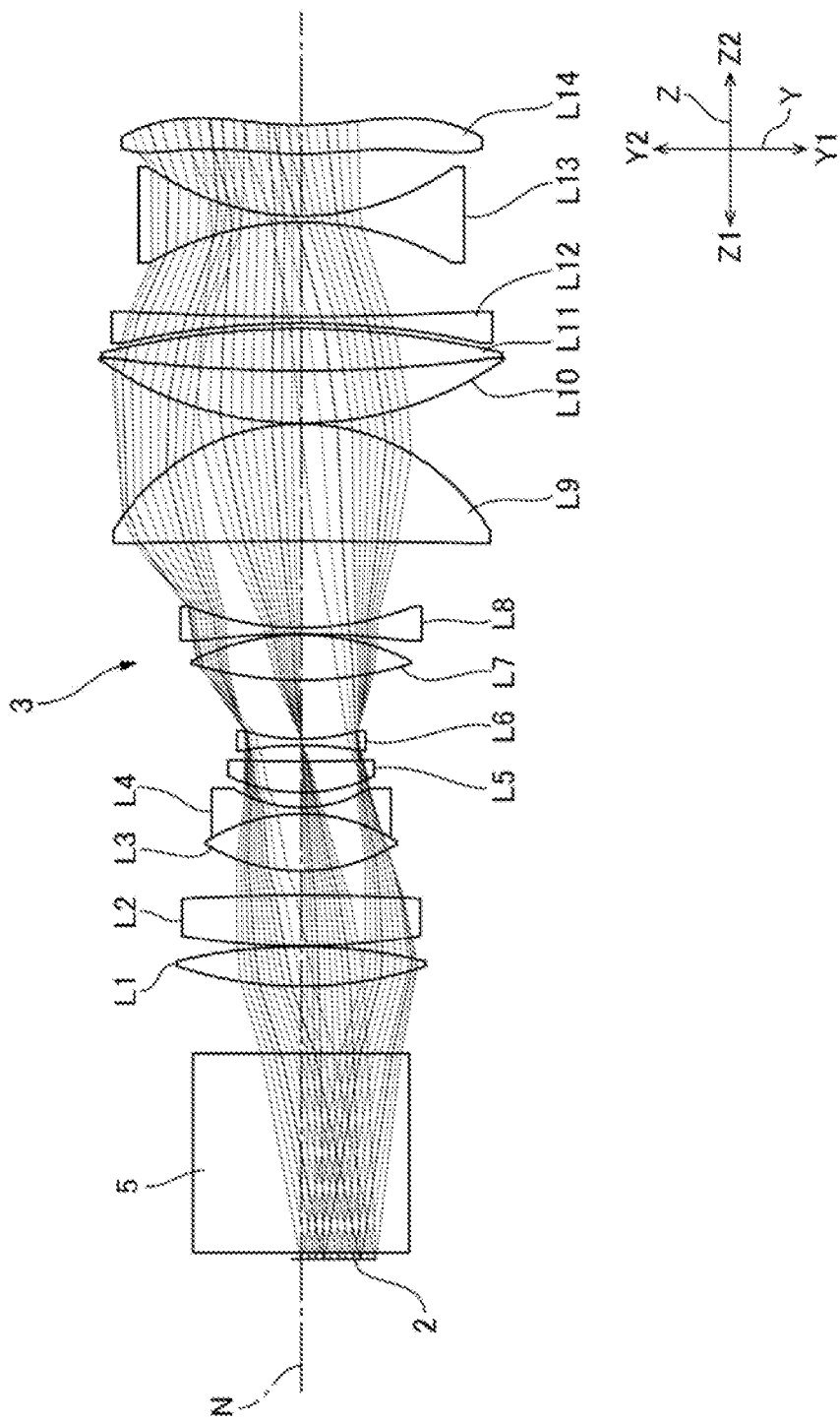
FIG. 2 is a ray diagram of a projection optical system of the projector.
Figure 3:
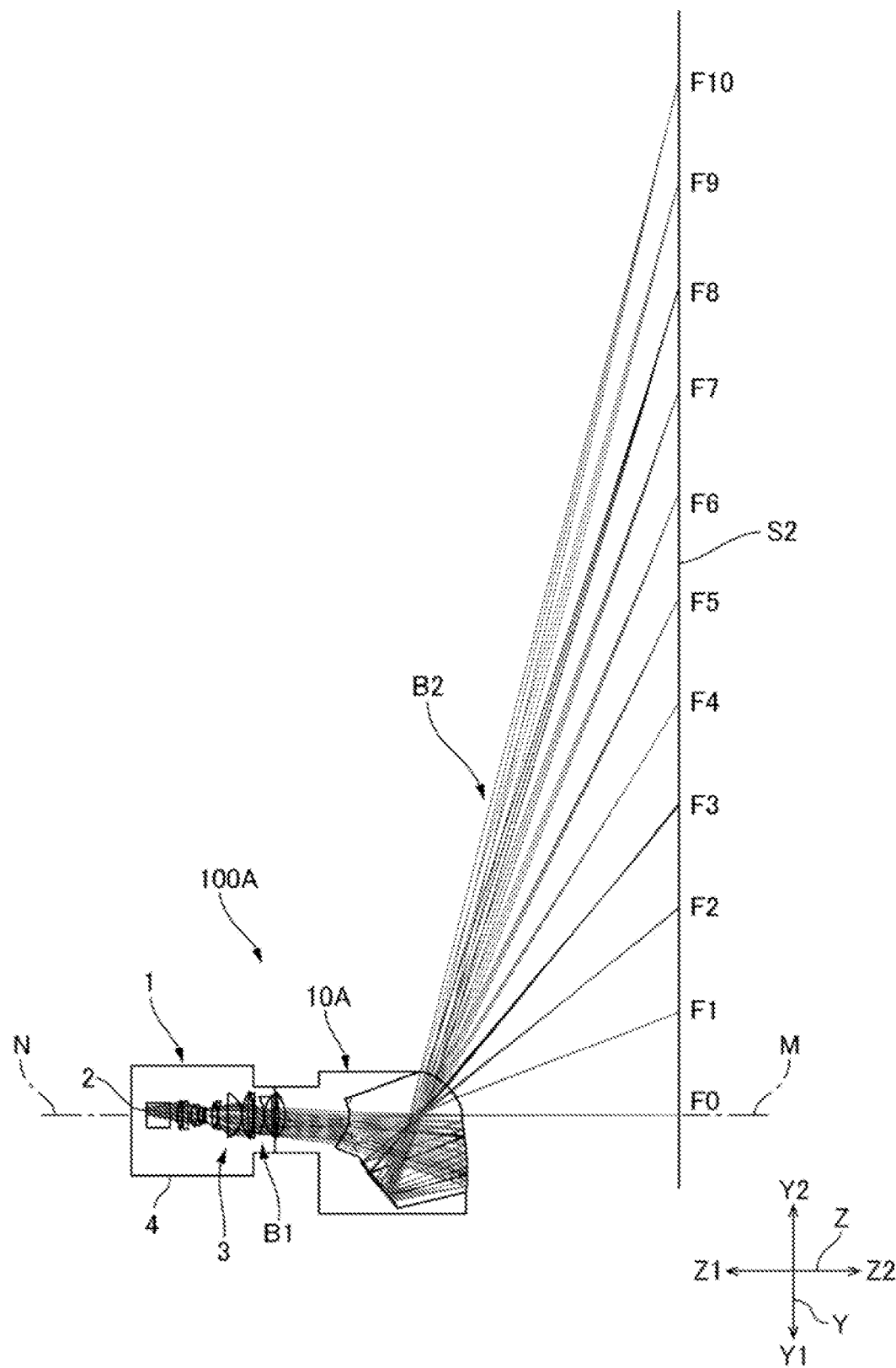
FIG. 3 is a ray diagram schematically showing the whole of a projector system according to Practical Example 1.
Figure 4:
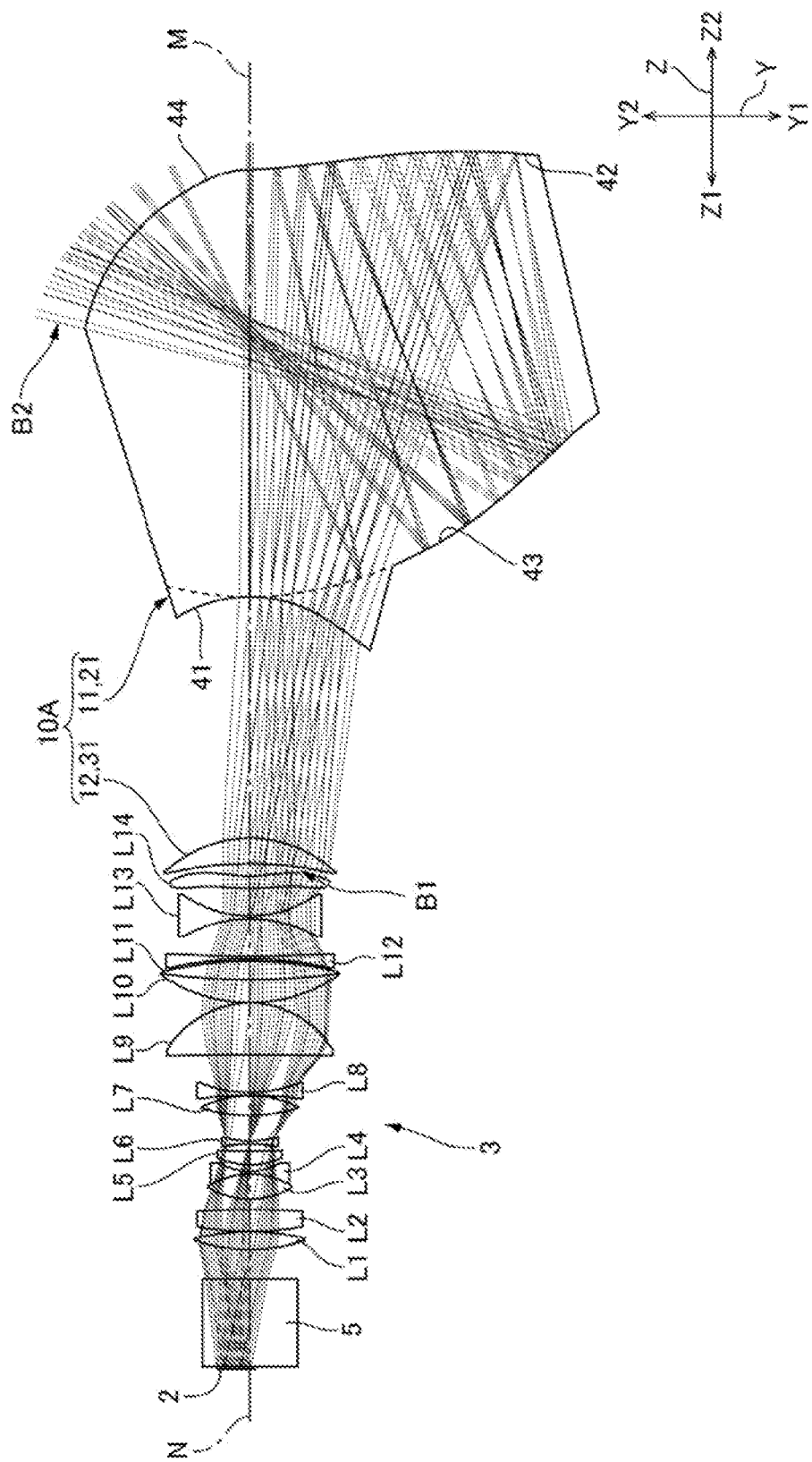
FIG. 4 is a ray diagram of the projection optical system of the projector and the attachment optical system according to Practical Example 1.
Figure 5:
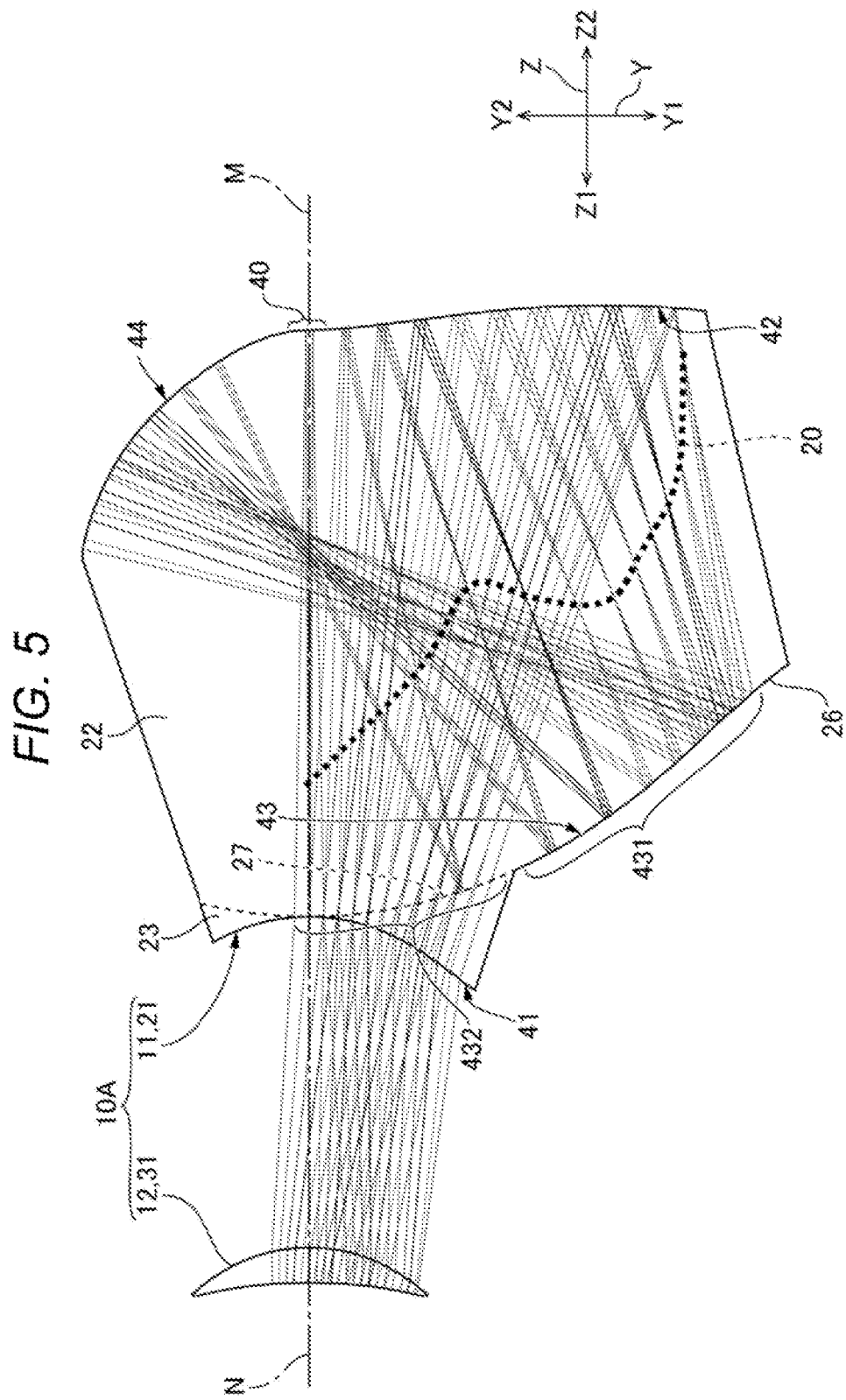
FIG. 5 is a configuration diagram of the attachment optical system according to Practical Example 1.

FIG. 1 is a ray diagram schematically showing the whole of the projector 1 to which the attachment optical system 10A can be attached. FIG. 2 is a ray diagram of a projection optical system 3 of the projector 1. FIG. 3 is a ray diagram schematically showing the whole of a projector system 100A. FIG. 4 is a ray diagram of the projection optical system 3 of the projector 1 and the attachment optical system 10A. FIG. 5 is a configuration diagram of the attachment optical system 10A. In FIG. 1 through FIG. 5, a light flux emitted from the projector 1 and the projector system 100A is schematically shown using light fluxes F0 through F10. The light flux F0 is a light flux emitted from the projector 1 and the projector system 100A, and then passes on a first optical axis N of the projection optical system 3. The light flux F10 is a light flux which reaches the position where the image height is the highest. The light fluxes F1 through F9 are each a light flux which reaches an intermediate position between the positions of the light flux F0 and the light flux F10.

The projector system 100A according to the present example is provided with the projector 1 as a projection display device, and the attachment optical system 10A detachably attached to the magnification side of the projection optical system 3 provided to the projector 1. Hereinafter, the projector 1 is described first, and then, the attachment optical system 10A is described.

As shown in FIG. 1, the projector 1 is provided with a light modulation element 2 for modulating light from a light source to form a projection image, a projection optical system 3 for projecting the projection image formed by the light modulation element 2 in an enlarged manner, and a chassis 4 for supporting the projection optical system 3. The light modulation element 2 is housed inside the chassis 4.

As shown in FIG. 2, the projection optical system 3 is a refracting optical system provided with a plurality of lenses. The light modulation element 2 is a liquid crystal panel. The light modulation element 2 is disposed on a demagnification side imaging plane of the projection optical system 3. The demagnification side imaging plane is perpendicular to the first optical axis N of the projection optical system 3. The light modulation element 2 forms the projection image below the first optical axis N. As shown in FIG. 1, first projection light B1 emitted from the projection optical system 3 spreads horizontally and upward with respect to the first optical axis N. As shown in FIG. 1, when using the projector 1 alone, a screen S1 is disposed on the magnification side imaging plane of the projection optical system 3. The magnification side imaging plane is perpendicular to the first optical axis N of the projection optical system 3.

Then, as shown in FIG. 3, the attachment optical system 10A is attached to a tip portion of the projection optical system 3 of the projector 1. In the present example, in order to conform a spreading direction of the projection light between before and after the attachment of the attachment optical system 10A to the projector 1, the attachment optical system 10A is attached to the projection optical system 3 after flipping the projector 1. Therefore, at the time point when the attachment optical system 10A is attached, the light modulation element 2 of the projector 1 forms the projection image above the first optical axis N of the projection optical system 3 as shown in FIG. 4. The first projection light B1 of the projector 1 spreads horizontally and downward with respect to the first optical axis N.

The attachment optical system 10A is provided with an anterior group 11 and a posterior group 12 (lens groups). In the present example, the anterior group 11 is formed of a single optical element 21. The posterior group is formed of a single positive lens 31 (a first lens). The positive lens 31 is disposed at the projection optical system 3 side of the optical element 21, and has positive power. The posterior group 12 is located between the anterior group 11 and the projection optical system 3. A second optical axis M of the attachment optical system 10A is located on an extension of the first optical axis N of the projection optical system 3. The second optical axis M is an optical axis of the optical element 21, and at the same time, an optical axis of the positive lens 31.

An imaging plane of the projector system 100A, namely an imaging plane of the projection optical system 3 and the attachment optical system 10A, is perpendicular to the first optical axis N. In other words, the imaging plane of the attachment optical system 10A is a plane perpendicular to the first optical axis N and the second optical axis M. In the present example, the imaging plane of the attachment optical system 10A is substantially parallel to the demagnification side imaging plane of the projection optical system 3 on which the light modulation element 2 provided to the projector 1 forms the projection image. The imaging plane of the projector system 100A is located at a position closer to the projection optical system 3 than the magnification side imaging plane of the projection optical system 3. In other words, the optical system of the projector system 100A constituted by the projection optical system 3 and the attachment optical system 10A is shorter in focal distance than the projection optical system 3. In other words, the distance between the imaging plane of the attachment optical system 10A and the projection optical system 3 is shorter than the distance between the magnification side imaging plane of the projection optical system 3 and the projection optical system 3. When using the projector system 100A, a screen S2 is disposed on the imaging plane of the projection optical system 3 and the attachment optical system 10A. Second projection light B2 emitted from the attachment optical system 10A spreads horizontally and upward with respect to the second optical axis M.

In the following description, three axes perpendicular to each other are defined as an X axis, a Y axis, and a Z axis for the sake of convenience. Further, an optical axis direction along the first optical axis N of the projection optical system 3 and the second optical axis M of the attachment optical system 10A is defined as a Z direction. A width direction of the screen S2 as the imaging plane of the projection optical system 3 and the attachment optical system 10A is defined as an X-axis direction, and a vertical direction of the screen S2 is defined as a Y direction. Further, in the Z direction, a side at which the projection optical system 3 is located is defined as a Z1 direction, and a side at which the attachment optical system 10A is located is defined as a Z2 direction. Further, a lower side and a downward direction are defined as a Y1 direction, and an upper side and a upward direction are defined as a Y2 direction.

Details of Projection Optical System and Attachment Optical System

As shown in FIG. 4, the projection optical system 3 is provided with lenses L1 through L14 in this order from the demagnification side toward the magnification side. The light modulation element 2 is disposed on the demagnification side imaging plane of the projection optical system 3. The light modulation element 2 forms the projection image at the Y2 direction side of the first optical axis N of the projection optical system 3. A prism 5 is disposed between the light modulation element 2 and the projection optical system 3. The first projection light B1 from the projection optical system 3 is emitted in the Y1 direction toward the Z2 direction from the lens L14.

The attachment optical system 10A is provided with the posterior group 12 and the anterior group 11 arranged from the projection optical system 3 side. In the present example, the posterior group 12 is the single positive lens 31 (the first lens), and the anterior group 11 is the single optical element 21. The optical element 21 is formed of a transparent optical member partially provided with reflective coating. The optical element 21 is provided with a plane of incidence 41 which transmits light from the positive lens 31, a first reflecting surface 42 which reflects the light transmitted through the plane of incidence 41, a second reflecting surface 43 which reflects the light from the first reflecting surface 42, and an exit surface 44 which transmits the light from the second reflecting surface 43. In other words, the optical element 21 has the plane of incidence 41, the first reflecting surface 42 which reflects the light emitted from the plane of incidence 41, the second reflecting surface 43 which reflects the light reflected by the first reflecting surface 42, and the exit surface 44 which transmits the light reflected by the second reflecting surface 43. The plane of incidence 41, the first reflecting surface 42, the second reflecting surface 43, and the exit surface 44 are each provided with a shape rotationally symmetric around the second optical axis M.

The plane of incidence 41 is located on the second optical axis M. The plane of incidence 41 is provided with a concave shape concaved toward the Z2 direction. In other words, the plane of incidence 41 has a concave shape concaved toward the Z2 direction (a second direction) opposite to the Z1 direction (a first direction) in which the projection optical system 3 is located with respect to the optical element 21 in the optical axis direction along the second optical axis M. The first reflecting surface 42 is located at the Z2 direction side of the plane of incidence 41. Further, the first reflecting surface 42 is disposed at the Y1 direction side of the second optical axis M. The first reflecting surface 42 is provided with a convex shape convexed toward the Z1 direction. The second reflecting surface 43 is located at the Z1 direction side of the first reflecting surface 42. Further, the second reflecting surface 43 is disposed at the Y1 direction side of the second optical axis M similarly to the first reflecting surface 42. The second reflecting surface 43 is provided with a concave shape concaved toward the Z1 direction. The exit surface 44 is located at the Z2 direction side of the second reflecting surface 43. Further, the exit surface 44 is disposed at the Y2 direction side of the second optical axis M. The exit surface 44 is provided with a convex shape convexed toward the Z2 direction.

As shown in FIG. 5, the first reflecting surface 42 and the exit surface 44 are continuous in an axial light flux pass area (an axial area) 40 of an axial light flux passing the second optical axis M in the Y direction. In other words, the axial light flux pass area 40 is a part of the first reflecting surface 42, and at the same time, a part of the exit surface 44. The axial light flux is light passing on the first optical axis N and the second optical axis M when the attachment optical system 10A is attached to the projector 1. In other words, the axial light flux pass area 40 is an area of the optical element 21 where the light passes the first optical axis N and the second optical axis M. Here, the second optical axis M is a design axis of the optical element 21. The axial light flux pass area 40 is an area which is uniquely defined when designing the optical element 21.

The first reflecting surface 42 is formed by disposing a reflective coating layer on an outside surface at the Y2 direction side of the optical element 21. In the first reflecting surface 42, a portion overlapping the axial light flux pass area 40 is provided with a half-mirror coating layer as the reflective coating layer. The half-mirror coating layer reflects the light crossing the second optical axis M toward the Z1 direction, and transmits the light parallel to the second optical axis M toward the Z2 direction. Thus, the light proceeding on the second optical axis M toward the Z2 direction is made to reach the screen S2.

Further, the first reflecting surface 42, the second reflecting surface 43, and the exit surface 44 overlap the plane of incidence 41 in the portion at the side close to the second optical axis M when viewed from the Z direction. Here, in the second reflecting surface 43, a first reflecting part 431 which does not overlap the plane of incidence 41 when viewed from the Z direction is formed by disposing a reflective coating layer on the outside surface at the Z1 direction side of the optical element 21. In the second reflecting surface 43, a second reflecting part 432 which overlaps the plane of incidence 41 when viewed from the Z direction is formed by providing a half-mirror coating layer which transmits light proceeding toward the Z2 direction, and reflects light proceeding toward the Z1 direction as the reflective coating layer. It should be noted that in order to dispose the half-mirror coating layer, the optical element 21 is constituted by two optical members, namely a first member 22 and a second member 23, wherein the first member 22 is provided with a first outside surface portion 26 having a convex shape obtained by transferring a surface shape of the second reflecting surface 43 to the outside surface at the Z1 direction side, and the second member 23 is provided with a second outside surface portion 27 having a concave shape corresponding to the surface shape of the second reflecting surface 43 on the outside surface at the Z2 direction side. The first member 22 is provided with a reflective coating layer in a portion which does not overlap the plane of incidence 41 when viewed from the Z direction in the first outside surface portion 26, and is provided with a half-mirror coating layer in a portion which overlaps the plane of incidence 41 when viewed from the Z direction. The second member 23 is bonded to the first member 22 provided with the reflective coating layer and the half-mirror coating layer from the Z1 direction side.

Here, inside the optical element 21, there is formed an intermediate image 20 which is conjugate with an enlarged image projected on the imaging plane. The intermediate image 20 is also conjugate with the projection image formed on the demagnification side imaging plane of the projection optical system 3. In the present example, the intermediate image 20 is formed between the first reflecting surface 42 and the second reflecting surface 43.

Lens Data

The projection distance of the projection optical system 3 is 3,776 mm. The projection distance of the projector system 100A constituted by the projection optical system 3 and the attachment optical system 10A is 295 mm. The numerical aperture of the optical system of the projector system 100A constituted by the projection optical system 3 and the attachment optical system 10A is 0.291. The lens data of such an optical system is as follows. The surface numbers are provided in sequence from the demagnification side toward the magnification side. The symbols represent the symbols of the liquid crystal panel, the prism, the lenses, the positive lenses, the first transmissive surface, the first reflecting surface, the second reflecting surface, the second transmissive surface, and the screen. Data of the surface number which corresponds to none of the liquid crystal panel, the prism, the lenses, the positive lenses, the first transmissive surface, the first reflecting surface, the second reflecting surface, the second transmissive surface, and the screen is dummy data. The reference symbol R represents a curvature radius. The reference symbol D represents an axial surface distance. The reference symbol C represents an aperture radius. The units of R, D, and C are millimeter. It should be noted that the integer portion of the numerical number shown in the glass material column represents a value obtained by multiplying the refractive index by 10 to the sixth power, and the fractional portion thereof represents a value obtained by multiplying the Abbe number by 10 to the second power.

| Symbol | Surface number | Shape | R | D | Glass material | Refraction/ Reflection | C |
|---|---|---|---|---|---|---|---|
|  | 0 | Sphere | Infinite | 0.0000 |  | Refraction | 0.0000 |
| 2 | 1 | Sphere | Infinite | 1.0000 |  | Refraction | 11.8500 |
| 5 | 2 | Sphere | Infinite | 31.5200 | BSC7_HOYA | Refraction | 12.0421 |
|  | 3 | Sphere | Infinite | 10.5830 |  | Refraction | 15.9895 |
| L1 | 4 | Sphere | 63.4927 | 6.2427 | 755201.2758 | Refraction | 18.5302 |
|  | 5 | Sphere | −86.6504 | 0.1500 |  | Refraction | 18.4984 |
| L2 | 6 | Sphere | 113.0626 | 8.0000 | 620410.6032 | Refraction | 17.7500 |
|  | 7 | Sphere | −322.2162 | 3.8537 |  | Refraction | 16.8468 |
| L3 | 8 | Sphere | 29.6639 | 9.0000 | 620410.6032 | Refraction | 14.0876 |
| L4 | 9 | Sphere | 28.7525 | 1.0000 | 711636.2959 | Refraction | 13.1654 |
|  | 10 | Sphere | 21.2205 | 2.3261 |  | Refraction | 10.8328 |
| L5 | 11 | Aspheric surface | 28.0983 | 4.8956 | 'L-LAL13F' | Refraction | 10.6417 |
|  | 12 | Aspheric surface | 447.7671 | 2.5509 |  | Refraction | 9.9002 |
| L6 | 13 | Sphere | −52.7374 | 1.0000 | 735228.2844 | Refraction | 9.3272 |
|  | 14 | Sphere | 32.6763 | 9.2757 |  | Refraction | 8.9481 |
| L7 | 15 | Sphere | 60.2596 | 7.1276 | 519962.6714 | Refraction | 15.8500 |
|  | 16 | Sphere | −39.0610 | 0.1500 |  | Refraction | 16.2786 |
| L8 | 17 | Sphere | −131.7368 | 1.0000 | 693899.3057 | Retraction | 16.9386 |
|  | 18 | Sphere | 49.3667 | 13.6163 |  | Refraction | 17.9406 |
| L9 | 19 | Sphere | −984.6296 | 18.5194 | 590527.6197 | Refraction | 27.2300 |
|  | 20 | Sphere | −35.2783 | 0.1500 |  | Refraction | 28.5130 |
| L10 | 21 | Sphere | 57.1056 | 8.273 | 752255.3064 | Refraction | 30.6227 |
| L11 | 22 | Sphere | 244.1650 | 6.6541 | 765201.2758 | Refraction | 30.3646 |
|  | 23 | Sphere | −132.2814 | 0.8497 |  | Refraction | 29.9636 |
| L12 | 24 | Sphere | −133.3243 | 1.0000 | 516699.5867 | Refraction | 28.7785 |
|  | 25 | Sphere | 486.4311 | 13.5653 |  | Refraction | 27.4481 |
| L13 | 26 | Sphere | −48.8600 | 1.0000 | 664422.3250 | Refraction | 24.0641 |
|  | 27 | Sphere | 42.0940 | 9.8949 |  | Refraction | 24.4204 |
| L14 | 28 | Aspheric surface | 63.6758 | 4.4911 | 'Z-330R' | Refraction | 26.1091 |
|  | 29 | Aspheric surface | 48.1826 | 1.3014 |  | Refraction | 27.1984 |
|  | 30 | Sphere | Infinite | 3.0576 |  | Refraction | 28.1190 |
| 31 | 31 | Aspheric surface | −160.2731 | 9.2093 | 'Z-330R' | Refraction | 29.5260 |
|  | 32 | Aspheric surface | −45.8891 | 86.7907 |  | Refraction | 30.2123 |
| 41 | 33 | Aspheric surface | −54.2363 | 154.0000 | 'Z-330R' | Refraction | 41.8092 |
| 42 | 34 | Aspheric surface | 94.4167 | −154.0000 | 'Z-330R' | Reflection | 101.6996 |
| 43 | 35 | Aspheric surface | 110.7354 | 154.0000 | 'Z-330R' | Reflection | 123.1516 |
| 44 | 36 | Aspheric surface | −31.7063 | 0.0000 |  | Refraction | 63.1950 |
|  | 37 | Sphere | Infinite | 295.0820 |  | Refraction | 281.8608 |
| S | 38 | Sphere | Infinite | 0.0000 |  | Refraction | 1423.7700 |

Aspheric coefficients are as follows.

| Surface number | S11 | S12 | S28 | S29 |
|---|---|---|---|---|
| R | 28.0983 | 447.7671 | 63.6758 | 48.1826 |
| K | 0.0853 | 0 | 0.458034063 | −10.5596866 |
| A | 1.03173E−06 | 8.65677E−06 | −2.95275E−05 | −2.24766E−05 |
| B | 5.91211E−09 | 3.23916E−08 | 4.67141E−08 | 3.60983E−08 |
| C | 4.00552E−10 | −2.16413E−11 | −7.44314E−11 | −6.44200E−11 |
| D | −4.280515−12 | −1.69783E−12 | 1.41620E−13 | 1.06499E−13 |
| E | 1.53605E−14 | 2.52965E−14 | −2.19886E−16 | −1.39771E−16 |
| F | 1.89586E−16 | 1.11658E−17 | 2.18119E−19 | 1.12686E−19 |
| G | −1.63865E−18 | −8.64798E−19 | −9.05008E−23 | −3.94115E−23 |
| H | 4.90367E−21 | 4.22411E−21 |  |  |

-continued

| Surface number | S31 | S32 | S33 | S34 |
|---|---|---|---|---|
| R | −160.2731 | −45.8891 | −54.2363 | 94.4167 |
| K | 21.52137195 | −0.967500303 | −1.093881002 | −42.5734219741 |
| A | −6.26964E−07 | −1.78504E−06 | −2.54783E−06 | −1.22116E−07 |
| B | −4.17354E−10 | −1.25470E−09 | 1.41619E−09 | 5.26590E−12 |
| C | 1.83771E−12 | 1.53496E−12 | −1.77705E−13 | −9.35969E−17 |

| Surface number | S35 | S36 |
|---|---|---|
| R | 110.7354 | −31.7063 |
| K | −7.0217115764 | −0.7414668010 |
| A | 2.54912E−07 | 4.18339E−06 |
| B | −1.16574E−11 | −6.72357E−10 |
| C | 4.92398E−16 | −3.86472E−14 |
| D | −1.89694E−20 | 2.69393E−17 |

Functions and Advantages

According to the present example, by attaching the attachment optical system 10A to the magnification side of the projection optical system 3 of the projector 1, it is possible to project the first projection light B1 from the projection optical system 3 on the imaging plane different from the magnification side imaging plane of the projection optical system 3. In the present example, the imaging plane of the projector system 100A is a plane perpendicular to the first optical axis N of the projection optical system 3. Further, such an imaging plane is located at a position closer to the projection optical system 3 than the magnification side imaging plane of the projection optical system 3. Specifically, while the projection distance of the projection optical system 3 is 3,776 mm, the projection distance of the projector system 100A in which the attachment optical system 10A is attached to the magnification side of the projection optical system 3 of the projector 1 is 295 mm. Therefore, by attaching the attachment optical system 10A to the projector 1, it is possible to make the projector 1 short focus.

Here, the attachment optical system 10A has the optical element 21 provided with the plane of incidence 41, the first reflecting surface 42 which reflects the light transmitted through the plane of incidence 41, the second reflecting surface 43 which reflects the light from the first reflecting surface 42, and the exit surface 44 which transmits the light from the second reflecting surface 43. When the attachment optical system 10A is attached to the projection optical system 3, the second optical axis M of the optical element 21 is located on the extension of the first optical axis N of the projection optical system 3, and the first reflecting surface 42 and the exit surface 44 are continuous in the axial light flux pass area 40 of the axial light flux passing the second optical axis M and the first optical axis N. Therefore, it is possible to make the second projection light B2 proceeding toward the screen S2 via the attachment optical system 10A reach the extension of the first optical axis N of the projection optical system 3.

Further, the attachment optical system 10A is provided with the plane of incidence 41 provided with the concave shape concaved toward the Z2 direction, the first reflecting surface 42 provided with the convex shape convexed toward the Z1 direction, the second reflecting surface 43 provided with the concave shape concaved toward the Z1 direction, and the exit surface 44 provided with the convex shape convexed toward the Z2 direction. Since the attachment optical system 10A is provided with these constituents, it is easy for the attachment optical system 10A to project the first projection light B1 from the projection optical system 3 in a more wide-angle manner, and at the same time, image the first projection light B1 at short focus length.

Further, in the present example, the single optical element 21 is provided with the first reflecting surface 42 and the second reflecting surface 43 as two reflecting surfaces, and the plane of incidence 41 and the exit surface 44 as two transmissive surfaces. Therefore, it is possible to suppress the number of optical members in the attachment optical system 10A.

Further, in the present example, the intermediate image 20 which is conjugate with an enlarged image projected on the imaging plane is formed inside the optical element 21. In other words, the optical element 21 forms the intermediate image 20 inside, and then images the intermediate image 20 on the imaging plane once again. Therefore, in the attachment optical system 10A, the imaging performance of the projection image is improved. Further, when the intermediate image 20 is formed inside the optical element 21, it is easy for the optical element 21 to convert the projection direction in which the projection image is projected.

Further, in the present example, the attachment optical system 10A has the positive lens 31 disposed at the projection optical system 3 side of the optical element 21. Since there is provided such a positive lens 31, it is possible to improve the imaging performance of the attachment optical system 10A.

Figure 6:
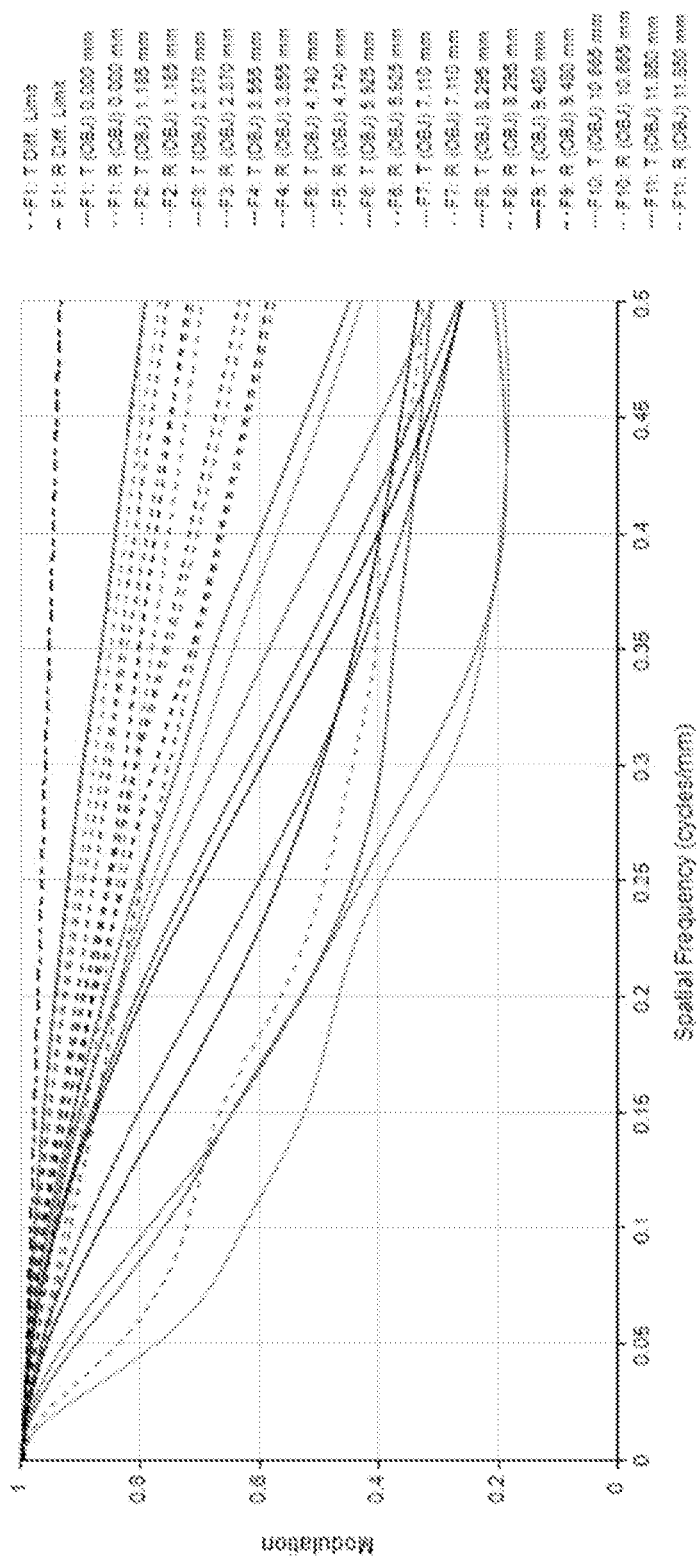
FIG. 6 is a diagram showing an MTF at a magnification side of the projector system according to Practical Example 1.

FIG. 6 is a diagram showing an MTF at the magnification side of the projector system. In FIG. 6, the horizontal axis represents a spatial frequency, and the vertical axis represents a contrast reproduction rate. As shown in FIG. 6, the projector system 100A in the present example has high resolution.

Here, in the present example, the attachment optical system 10A is attached to the projection optical system 3 after flipping the projector 1. Thus, the light modulation element 2 of the projector 1 forms the projection image above the first optical axis N of the projection optical system 3 as shown in FIG. 3. The first projection light B1 from the projection optical system 3 spreads from the first optical axis N downward with respect to the first optical axis N. In contrast, the exit surface 44 of the attachment optical system 10A is located above the second optical axis M, and the first reflecting surface 42 and the second reflecting surface 43 are located below the second optical axis M. Thus, the second projection light B2 from the attachment optical system 10A spreads from the second optical axis M upward with respect to the second optical axis M. In this way, it is possible to conform the spreading direction of the projection light between before and after the attachment of the attachment optical system 10A to the projector 1.

It should be noted that when the projector 1 is provided with, for example, a shift mechanism for supporting the light modulation element 2 so as to be able to move along the Y direction in the demagnification side imaging plane of the projection optical system 3, it is possible to attach the attachment optical system 10A to the projection optical system 3 without flipping the projector 1. In this case, it is assumed that the light modulation element 2 is moved by the shift mechanism along a direction perpendicular to the first optical axis N instead of flipping the projector 1 to form the projection image above the first optical axis N. Thus, the first projection light B1 emitted from the projection optical system 3 spreads from the first optical axis N horizontally and downward with respect to the first optical axis N. Therefore, by locating the exit surface 44 above the second optical axis M, and locating the first reflecting surface 42 and the second reflecting surface 43 below the second optical axis M when attaching the attachment optical system 10A to the projection optical system 3, the second projection light B2 emitted from the attachment optical system 10A spreads from the second optical axis M upward with respect to the second optical axis M.

Practical Example 2

Figure 7:
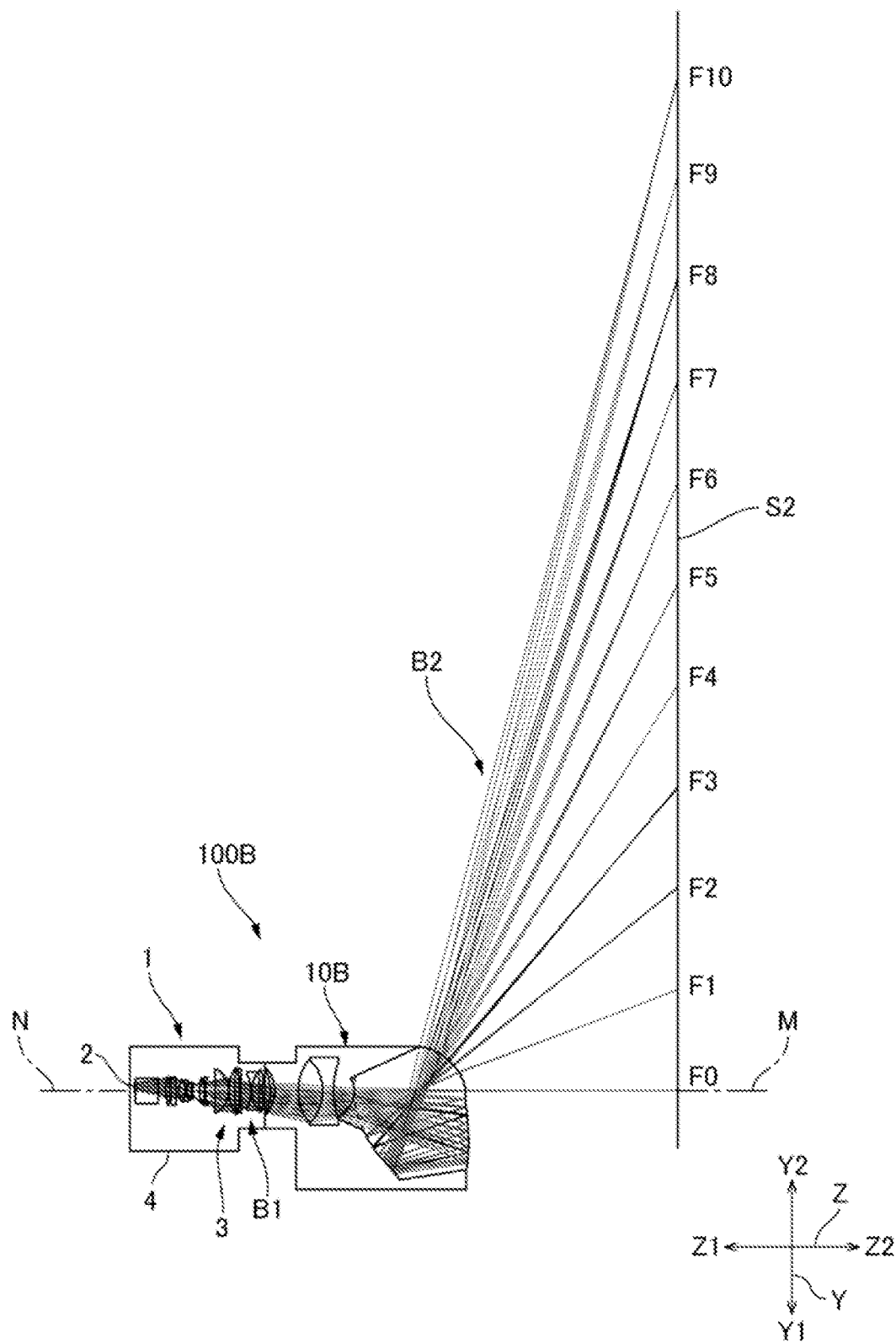
FIG. 7 is a ray diagram schematically showing the whole of a projector system according to Practical Example 2.
Figure 8:
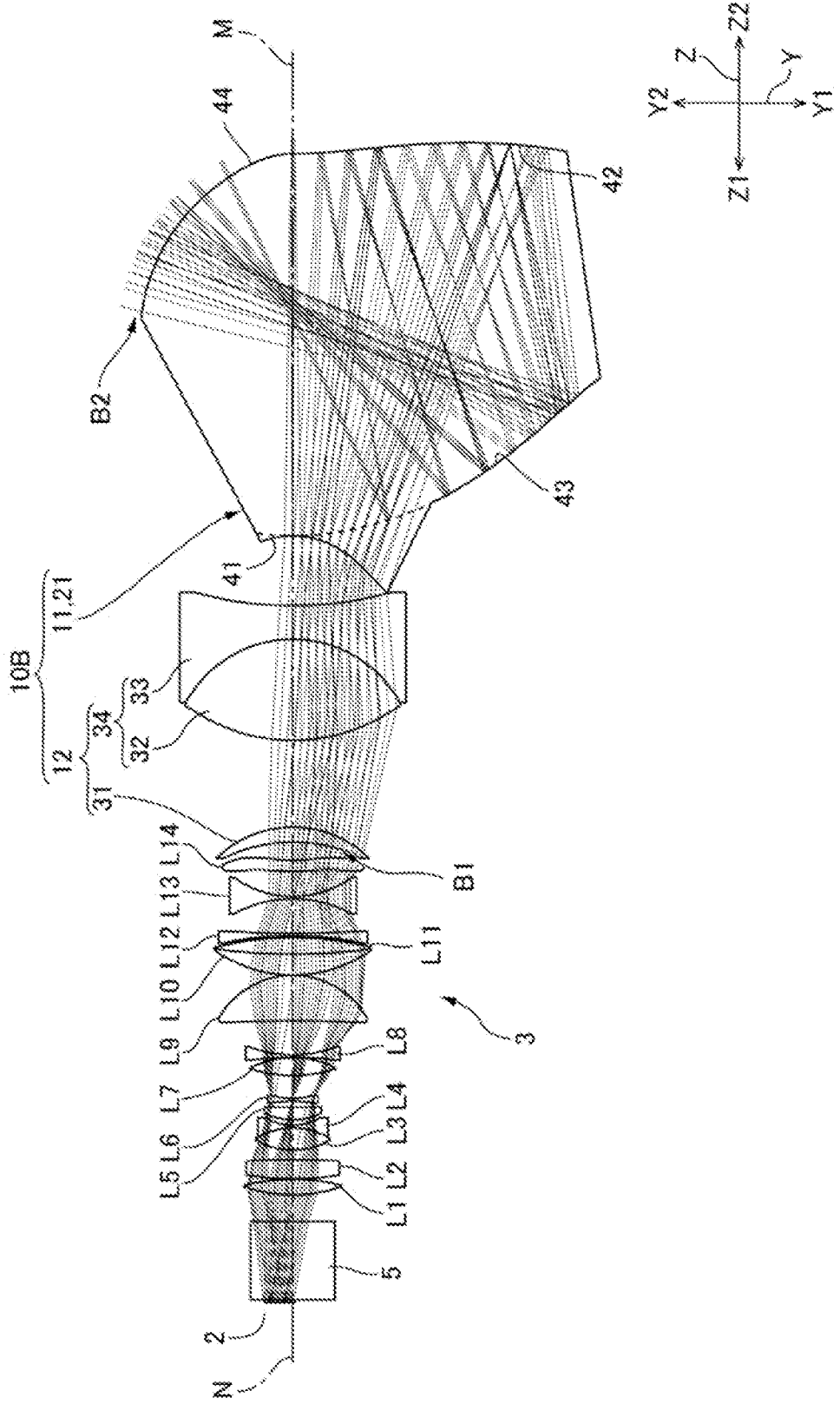
FIG. 8 is a ray diagram of the projection optical system of the projector and an attachment optical system according to Practical Example 2.
Figure 9:
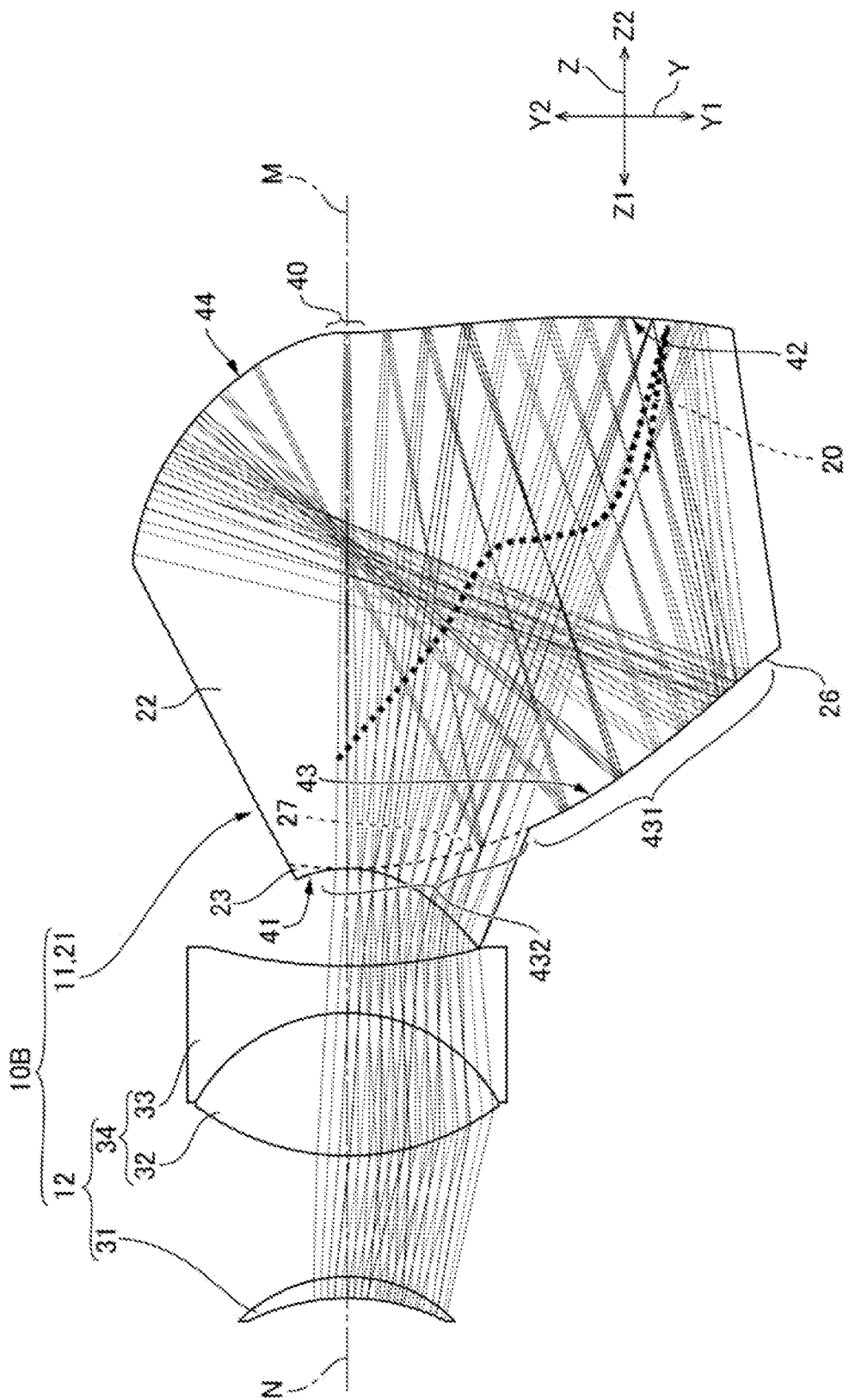
FIG. 9 is a configuration diagram of the attachment optical system according to Practical Example 2.

FIG. 7 is a ray diagram schematically showing the whole of a projector system 100B according to Practical Example 2. FIG. 8 is a ray diagram of the projection optical system 3 of the projector 1 and an attachment optical system 10B. FIG. 9 is a configuration diagram of the attachment optical system 10B.

As shown in FIG. 7, the projector system 100B in the present example as Practical Example 2 is constituted by the projector 1, and the attachment optical system 10B detachably attached to the projection optical system 3 of the projector 1. When the attachment optical system 10B is attached to the projector 1, the second optical axis M of the attachment optical system 10B is located on the extension of the first optical axis N of the projection optical system 3. An imaging plane of an optical system of the projector system 100B constituted by the projection optical system 3 and the attachment optical system 10B is a plane perpendicular to the first optical axis N of the projection optical system 3. The imaging plane of the optical system of the projector system 100B, namely an imaging plane of the attachment optical system 10B, is located at a position closer to the projection optical system 3 than the magnification side imaging plane of the projection optical system 3 of the projector 1. In other words, the imaging plane of the attachment optical system 10B is a plane perpendicular to the first optical axis N and the second optical axis M, and the distance between the imaging plane and the projection optical system 3 is shorter than the distance between the magnification side imaging plane of the projection optical system 3 and the projection optical system 3. In the present example, the imaging plane of the attachment optical system 10B is substantially parallel to the demagnification side imaging plane of the projection optical system 3 on which the light modulation element 2 provided to the projector 1 forms the projection image. In the present example, the projector 1 is the same as in Practical Example 1.

As shown in FIG. 3, the attachment optical system 10B is provided with the anterior group 11 and the posterior group 12 (the lens groups). In the present example, the anterior group 11 is formed of a single optical element 21. The posterior group 12 is provided with the positive lens 31, a positive lens 32 (a second lens), and a negative lens 33 (a third lens) in this order from the demagnification side toward the magnification side. The positive lens 32 and the negative lens 33 are disposed at the projection optical system 3 side of the optical element 21. The positive lens 32 has positive power. The negative lens 33 is disposed at the magnification side of the positive iens 32, and has negative power. The positive lens 32 and the negative lens 33 are different in Abbe number from each other. In the present example, the positive lens 32 and the negative lens 33 are bonded to each other to form a single cemented lens 34.

As shown in FIG. 9, the optical element 21 is provided with the plane of incidence 41 which transmits light from the cemented lens 34, the first reflecting surface 42 which reflects the light transmitted through the plane of incidence 41, the second reflecting surface 43 which reflects the light from the first reflecting surface 42, and the exit surface 44 which transmits the light from the second reflecting surface 43. In other words, the optical element 21 has the plane of incidence 41, the first reflecting surface 42 which reflects the light emitted from the plane of incidence 41, the second reflecting surface 43 which reflects the light reflected by the first reflecting surface 42, and the exit surface 44 which transmits the light reflected by the second reflecting surface 43. The plane of incidence 41, the first reflecting surface 42, the second reflecting surface 43, and the exit surface 44 are each provided with the shape rotationally symmetric around the second optical axis M. The plane of incidence 41 is located on the second optical axis M. The plane of incidence 41 is provided with a concave shape concaved toward the Z2 direction. In other words, the plane of incidence 41 has the concave shape concaved toward the Z2 direction (the second direction) opposite to the Z1 direction (the first direction) in which the projection optical system 3 is located with respect to the optical element 21 in the optical axis direction along the second optical axis M. The first reflecting surface 42 is located at the Z2 direction side of the plane of incidence 41. Further, the first reflecting surface 42 is disposed at the Y1 direction side of the second optical axis M. The first reflecting surface 42 is provided with the convex shape convexsd toward the Z1 direction. The second reflecting surface 43 is located at the Z1 direction side of the first reflecting surface 42. Further, the second reflecting surface 43 is disposed at the Y1 direction side of the second optical axis M similarly to the first reflecting surface 42. The second reflecting surface 43 is provided with the concave shape concaved toward the Z1 direction. The exit surface 44 is located at the Z2 direction side of the second reflecting surface 43. Further, the exit surface 44 is disposed at the Y2 direction side of the second optical axis M. The exit surface 44 is provided with the convex shape convexed toward the Z2 direction.

As shown in FIG. 9, the first reflecting surface 42 and the exit surface 44 are continuous in the axial light flux pass area (the axial area) 40 of the axial light flux passing the second optical axis M in the Y direction. In other words, the axial light flux pass area 40 is a part of the first reflecting surface 42, and at the same time, a part of the exit surface 44. The axial light flux is the light passing cn the first optical axis N and the second optical axis M when the attachment optical system 10B is attached to the projector 1. In other words, the axial light flux pass area 40 is an area of the optical element 21 where the light passes the first optical axis N and the second optical axis M. Here, the second optical axis M is the design axis of the optical element 21. The axial light flux pass area 40 is the area which is uniquely defined when designing the optical element 21.

The first reflecting surface 42 is formed by disposing a reflective coating layer on an outside surface at the Z2 direction side of the optical element 21. In the first reflecting surface 42, the portion overlapping the axial light flux pass area 40 is provided with the half-mirror coating layer as the reflective coating layer. Thus, the light proceeding on the second optical axis M toward the Z2 direction is made to reach the screen S2. Further, the first reflecting surface 42, the second reflecting surface 43, and the exit surface 44 overlap the plane of incidence 41 in the portion at the side close to the second optical axis M when viewed from the Z direction. In the second reflecting surface 43, the first reflecting part 431 which does not overlap the plane of incidence 41 when viewed from the Z direction is formed by disposing the reflective coating layer on the outside surface at the Z1 direction side of the optical element 21. In the second reflecting surface 43, the second reflecting part 432 which overlaps the plane of incidence 41 when viewed from the Z direction is formed by providing the half-mirror coating layer which transmits light proceeding toward the Z2 direction, and reflects light proceeding toward the Z1 direction as the reflective coating layer.

Here, inside the optical element 21, there is formed the intermediate image 20 which is conjugate with the enlarged image projected on the imaging plane. The intermediate image 20 is also conjugate with the projection image formed on the demagnification side imaging plane of the projection optical system 3. In the present example, the intermediate image 20 is formed between the first reflecting surface 42 and the second reflecting surface 43.

Lens Data

The projection distance of the projection optical system 3 is 3,776 mm. The projection distance of the projector system 100B constituted by the projection optical system 3 and the attachment optical system 10B is 295 mm. The numerical aperture of the optical system of the projector system 100B constituted by the projection optical system 3 and the attachment optical system 10B is 0.291. The lens data of such an optical system is as follows. The surface numbers are provided in sequence from the demagnification side toward the magnification side. The symbols represent the symbols of the liquid crystal panel, the prism, the lenses, the positive lenses, the negative lens, the first transmissive surface, the first reflecting surface, the second reflecting surface, the second transmissive surface, and the screen. Data of the surface number which corresponds to none of the liquid crystal panel, the prism, the lenses, the positive lenses, the negative lens, the first transmissive surface, the first reflecting surface, the second reflecting surface, the second transmissive surface, and the screen is dummy data. The reference symbol R represents a curvature radius. The reference symbol D represents an axial surface distance. The reference symbol C represents an aperture radius. The units of R, D, and C are millimeter. It should be noted that the integer portion of the numerical number shown in the glass material column represents a value obtained by multiplying the refractive index by 10 to the sixth power, and the fractional portion thereof represents a value obtained by multiplying the Abbe number by 10 to the second power.

| Symbol | Surface number | Shape | R | D | Glass material | Refraction/ Reflection | C |
|---|---|---|---|---|---|---|---|
|  | 0 | Sphere | INFINITE | 0.0000 |  | Refraction | 0.0000 |
| 2 | 1 | Sphere | INFINITE | 1.0000 |  | Refraction | 11.8500 |
| 5 | 2 | Sphere | INFINITE | 31.5200 | BSC7_HOYA | Refraction | 12.0421 |
|  | 3 | Sphere | INFINITE | 10.5830 |  | Refraction | 15.9895 |
| L1 | 4 | Sphere | 63.4927 | 6.2427 | 755201.2758 | Refraction | 18.5302 |
|  | 5 | Sphere | −86.6504 | 0.1500 |  | Refraction | 18.4984 |
| L2 | 6 | Sphere | 113.0626 | 8.0000 | 620410.6032 | Refraction | 17.7500 |
|  | 7 | Sphere | −322.2162 | 3.8537 |  | Refraction | 16.8468 |
| L3 | 8 | Sphere | 29.6639 | 9.0000 | 620410.6032 | Refraction | 14.0876 |
| L4 | 9 | Sphere | −28.7525 | 1.0000 | 711636.2959 | Refraction | 13.1654 |
|  | 10 | Sphere | 21.2205 | 2.3261 |  | Refraction | 10.8328 |
| L5 | 11 | Aspheric surface | 28.0983 | 4.8956 | 'L-LAL13F' | Refraction | 10.6417 |
|  | 12 | Aspheric surface | 447.7671 | 2.5509 |  | Refraction | 9.9002 |
| L6 | 13 | Sphere | −52.7374 | 1.0000 | 735228.2844 | Refraction | 9.3272 |
|  | 14 | Sphere | 32.6763 | 9.2757 |  | Refraction | 8.9481 |
| L7 | 15 | Sphere | 60.2596 | 7.1276 | 519962.6714 | Refraction | 15.8500 |
|  | 16 | Sphere | −39.0610 | 0.1500 |  | Refraction | 16.2786 |
| L8 | 17 | Sphere | −131.7368 | 1.0000 | 693899.3057 | Refraction | 16.9386 |
|  | 18 | Sphere | 49.3667 | 13.6163 |  | Refraction | 17.9406 |
| L9 | 19 | Sphere | −984.6296 | 18.5194 | 590527.6197 | Refraction | 27.2300 |
|  | 20 | Sphere | −35.2783 | 0.1500 |  | Refraction | 28.5130 |
| L10 | 21 | Sphere | 57.1056 | 8.2723 | 752255.3064 | Refraction | 30.6227 |
| L11 | 22 | Sphere | 244.1650 | 6.6541 | 755201.2758 | Refraction | 30.3546 |
|  | 23 | Sphere | −132.2814 | 0.8497 |  | Refraction | 29.9836 |
| L12 | 24 | Sphere | −133.3243 | 1.0000 | 516699.5867 | Refraction | 28.7785 |
|  | 25 | Sphere | 486.4311 | 14.0443 |  | Refraction | 27.4481 |
| L13 | 26 | Sphere | −48.8600 | 1.0000 | 664422.3250 | Refraction | 24.0641 |
|  | 27 | Sphere | 42.0940 | 9.8949 |  | Refraction | 24.4204 |
| L14 | 28 | Aspheric surface | 63.6758 | 4.4911 | 'Z-330R' | Refraction | 26.1091 |
|  | 29 | Aspheric surface | 48.1826 | 0.8324 |  | Refraction | 27.1984 |
|  | 30 | Sphere | INFINITE | 6.5446 |  | Refraction | 27.9236 |
| 31 | 31 | Sphere | −65.0778 | 6.0652 | BK7_SCHOTT | Refraction | 28.0042 |
|  | 32 | Sphere | −45.1776 | 34.8592 |  | Refraction | 30.2455 |

-continued

| Symbol | Surface number | Shape | R | D | Glass material | Refraction/ Reflection | C |
|---|---|---|---|---|---|---|---|
| 32 | 33 | Sphere | 74.0561 | 40.9792 | 563944.6367 | Refraction | 44.5791 |
| 33 | 34 | Sphere | −50.2699 | 13.4768 | 592429.5950 | Refraction | 44.1768 |
|  | 35 | Sphere | 150.8414 | 28.1248 |  | Refraction | 40.1403 |
| 41 | 36 | Aspheric surface | −35.5750 | 154.0000 | 'Z-330R' | Refraction | 40.1407 |
| 42 | 37 | Aspheric surface | 136.8952 | −154.0000 | 'Z-330R' | Reflection | 108.6154 |
| 43 | 38 | Aspheric surface | 117.4779 | 154.0000 | 'Z-330R' | Reflection | 122.2696 |
| 44 | 39 | Aspheric surface | −34.0536 | 0.0000 |  | Refraction | 65.2586 |
|  | 40 | Sphere | INFINITE | 295.0820 |  | Refraction | 302.8489 |
| S | 41 | Sphere | INFINITE | 0.0000 |  | Refraction | 1421.9277 |

Aspheric coefficients are as follows.

| | Surface number | | | |
|---|---|---|---|---|
| | S11 | S12 | S28 | S29 |
| R | 28.0983 | 447.7671 | 63.6758 | 48.1826 |
| K | 0.0853 | 0 | 0.458034063 | −10.5596866 |
| A | 1.03173E−06 | 8.65677E−06 | −2.95275E−05 | −2.24766E−05 |
| B | 5.91211E−09 | 3.23916E−08 | 4.67141E−08 | 3.60983E−08 |
| C | 4.00552E−10 | −2.16413E−11 | −7.44314E−11 | −6.44200E−11 |
| D | −4.28051E−12 | −1.69783E−12 | 1.41620E−13 | 1.06499E−13 |
| E | 1.53605E−14 | 2.52965E−14 | −2.19886E−16 | −1.39771E−16 |
| F | 1.89586E−16 | 1.11658E−17 | 2.18119E−19 | 1.12686E−19 |
| G | −1.63865E−18 | −8.64798E−19 | −9.05008E−23 | −3.94115E−23 |
| H | 4.90367E−21 | 4.22411E−21 | | |

| | Surface number | | | |
|---|---|---|---|---|
| | S36 | S37 | S38 | S39 |
| R | −35.5750 | 136.8952 | 117.4779 | −34.0536 |
| K | −1.194781095 | −69.64270173 | −1.013592364 | −0.7150019510 |
| A | −3.70737E−06 | −1.18711E−07 | −6.12974E−08 | 2.80685E−06 |
| B | 1.30118E−09 | 5.93873E−12 | 1.29269E−11 | −3.19369E−10 |
| C | 8.60165E−14 | −1.53636E−16 | −8.09145E−16 | −4.61825E−14 |
| D | | | 1.15686E−20 | 1.64220E−17 |

The Abbe numbers vd of the positive lens 32 and the negative lens 33 are as follows.

| Symbol | Surface number | vd |
|---|---|---|
| 32 | 33 | 63.67 |
| 33 | 34 | 59.50 |

Functions and Advantages

According to the projector system 100B in the present example, it is possible to obtain substantially the same advantages as chose of the projector system 100A described above. In the present example, while the projection distance of the projection optical system 3 is 3,776 mm, the projection distance of the projector system 100B in which the attachment optical system 10B is attached to the magnification side of the projection optical system 3 of the projector 1 is 295 mm.

Further, in the present example, the attachment optical system 10B has the posterior group 12 which is disposed at the Z1 direction side of the optical element 21, and is provided with the positive power. Therefore, it is possible to improve the imaging performance of the attachment optical system 10B.

Further, the positive lens 32 and the negative lens 33 constituting the posterior group 12 are different in Abbe number from each other. Therefore, according to the projector system 100B in the present example, it becomes easy to correct a chromatic aberration.

Figure 10:
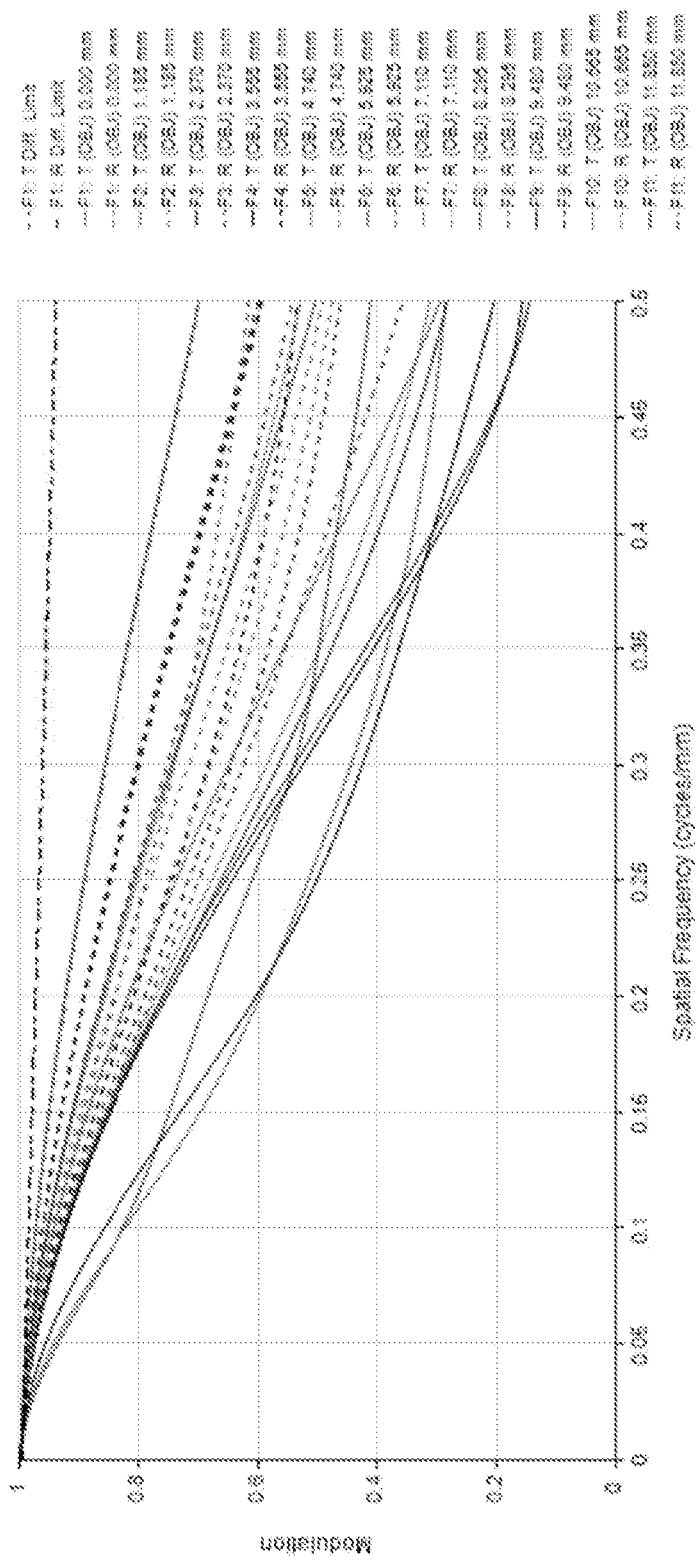
FIG. 10 is a diagram showing an MTF at a magnification side of the projector system according to Practical Example 2.

FIG. 10 is a diagram showing an MTF at the magnification side of the projector system 100B. In FIG. 10, the horizontal axis represents a spatial frequency, and the vertical axis represents a contrast reproduction rate. As shown in FIG. 10, the projector system 100B in the present example has high resolution.

What is claimed is:

1. An attachment optical system to detachably be attached to a magnification side of a projection optical system provided to a projection display device, and configured to project projection light emitted from the projection optical system on an imaging plane different from a magnification side imaging plane of the projection optical system, the attachment optical system comprising:

an optical element having a second optical axis arranged on an extension of a first optical axis of the projection optical system, wherein the optical element has:
- a plane of incidence arranged on the second optical axis, wherein the projection light emitted from the projection optical system is incident on the plane of incidence to proceed to a first reflecting surface,
- the first reflecting surface configured to reflect light emitted from the plane of incidence,
- a second reflecting surface configured to reflect light reflected by the first reflecting surface, and
- an exit surface configured to transmit light reflected by the second reflecting surface such that light passing through the exit surface proceeds directly to the imaging plane without passing through another optical element, the first reflecting surface and the exit surface are continuous in an axial area where light passes the second optical axis and the first optical axis, the imaging plane of the attachment optical system is substantially parallel to a demagnification side imaging plane of the projection optical system on which a light modulation element provided to the projection display device forms a projection image, the imaging plane is a plane perpendicular to the first optical axis and the second optical axis, and a distance between the imaging plane and the projection optical system is shorter than a distance between the magnification side imaging plane and the projection optical system.

2. The attachment optical system according to claim 1, wherein
- the plane of incidence has a concave shape concaved toward a second direction opposite to a first direction in which the projection optical system is located with respect to the optical element in an optical axis direction along the second optical axis,
- the first reflecting surface has a convex shape convexed toward the first direction,
- the second reflecting surface has a concave shape concaved toward the first direction, and
- the exit surface has a convex shape convexed toward the second direction.

3. The attachment optical system according to claim 1, wherein
- an intermediate image conjugate with an enlarged image to be projected on the imaging plane is formed inside the optical element.

4. The attachment optical system according to claim 1, further comprising:
- a first lens which is arranged at the projection optical system side of the optical element, and has positive power.

5. The attachment optical system according to claim 1, further comprising:
- a lens group which is arranged at the projection optical system side of the optical element, and has positive power, wherein
- the lens group has a second lens having positive power, and a third lens having negative power, and
- the second lens and the third lens are different in Abbe number from each other.

6. A projection display system comprising:
- the attachment optical system according to claim 1; and
- a projection display device having a projection optical system, wherein
- the attachment optical system is detachably attached to the projection optical system.

7. The projection display system according to claim 6, wherein
- the projection display device has a light modulation element configured to modulate light emitted from a light source to form a projection image,
- the light modulation element is arranged on a demagnification side imaging plane of the projection optical system, and forms the projection image at one side of the first optical axis of the projection optical system,
- first projection light emitted from the projection optical system spreads toward another side of the first optical axis,
- the first reflecting surface and the second reflecting surface are arranged at another side of the second optical axis,
- the exit surface is arranged at one side of the second optical axis, and
- second projection light emitted from the attachment optical system spreads toward one side of the second optical axis.

* * * * *